United States Patent
Dinh et al.

(10) Patent No.: US 8,454,913 B2
(45) Date of Patent: Jun. 4, 2013

(54) USE OF BUTYRALDEHYDE OXIME AS AN ANTI-NITROUS AGENT IN AN OPERATION FOR THE REDUCTIVE STRIPPING OF PLUTONIUM

(75) Inventors: Binh Dinh, Pont Saint Esprit (FR); Pascal Baron, Bagnols sur Ceze (FR); Philippe Moisy, Nimes (FR); Laurent Venault, Manduel (FR); Patrick Pochon, Saint-Laurent-des-Arbres (FR); Gilles Bernier, Avignon (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/663,181

(22) PCT Filed: Jun. 5, 2008

(86) PCT No.: PCT/EP2008/057035
§ 371 (c)(1),
(2), (4) Date: Aug. 19, 2010

(87) PCT Pub. No.: WO2008/148863
PCT Pub. Date: Dec. 11, 2008

(65) Prior Publication Data
US 2010/0310438 A1    Dec. 9, 2010

(30) Foreign Application Priority Data
Jun. 7, 2007 (FR) ..................... 07 55544

(51) Int. Cl.
*C22B 60/00* (2006.01)

(52) U.S. Cl.
USPC ...................... 423/8; 423/9; 423/10

(58) Field of Classification Search
USPC ................ 423/8–10; 976/DIG. 279; 376/310, 376/311
See application file for complete search history.

(56) References Cited

U.S. PATENT DOCUMENTS
6,413,482 B1 * 7/2002 Baranov et al. ................... 423/9
2008/0898191    4/2008 Moulin FOREIGN PATENT DOCUMENTS
WO    WO 00 13187       3/2000
WO    WO 2006/072729 A1  7/2006

OTHER PUBLICATIONS

Richardson et al., "Plutonium Partitioning in the Purex Process With Hydrazine-Stabilized Hydroxylamine Nitrate", HEDL-TME 75-31, pp. ii-v, 1-2.

* cited by examiner

*Primary Examiner* — Steven Bos
(74) *Attorney, Agent, or Firm* — Miles & Stockbridge P.C.

(57) ABSTRACT

The invention relates to the use of butyraldehyde oxime as an anti-nitrous agent in a plutonium stripping operation based on a reduction of this element from oxidation state (IV) to oxidation state (III). Applications: any nuclear fuel reprocessing process in which employing a compound that has the twofold property of being extractable into an organic phase and of being capable of destroying the nitrous acid therein may be useful and especially any process including one or more operations for the reductive stripping of plutonium.

9 Claims, 2 Drawing Sheets

USE OF BUTYRALDEHYDE OXIME AS AN ANTI-NITROUS AGENT IN AN OPERATION FOR THE REDUCTIVE STRIPPING OF PLUTONIUM

TECHNICAL FIELD

The present invention relates to the use of butyraldehyde oxime as an anti-nitrous agent in a plutonium stripping operation based on a reduction of this element from oxidation state (IV) to oxidation state (III).

The invention may be applied to any process for reprocessing spent nuclear fuels in which the use of a compound having the twofold property of being extractable into organic phase and of being capable of destroying nitrous acid therein may be useful and, especially, to those processes that include one or more operations for the reductive stripping of plutonium.

Such operations are, for example, present in the first decontamination cycle of the Purex process as employed in modern reprocessing plants (plants UP3 and UP2-800 at the La Hague site in France; Rokkasho plant in Japan) and also in the plutonium purification cycle known as the "Second plutonium cycle" which follows it.

They are also present in a certain number of processes derived from the Purex process, for instance the one described in the international PCT application published under the number WO 2006/072729 in the name of the Commissariat à l'Energie Atomique.

PRIOR ART

Operations for the reductive stripping of plutonium consist in passing this element from an organic phase (or solvent phase), in which it is in oxidation state (IV), into an aqueous phase by reducing it to oxidation state (III), in which state its affinity for the solvent phase is very low.

The reduction of plutonium(IV) to plutonium(III) is induced with a reducing agent that is added to the aqueous phase and that is stabilized with an anti-nitrous agent.

In the case, for example, of the first decontamination cycle of the Purex process employed in the abovementioned plants at La Hague and Rokkasho, the reducing agent used to strip the plutonium during the partition of the U/Pu streams is uranous nitrate or U(IV), whereas the anti-nitrous agent is hydrazinium nitrate, also known as hydrazine.

The main chemical reactions to be taken into consideration are:

the reduction of Pu(IV) to Pu(III) with uranous nitrate (functional reaction):

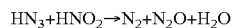

the reoxidation of Pu(III) to Pu(IV) (parasite reaction):

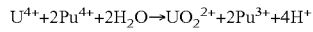

the destruction of the nitrous acid to hydrazoic acid with hydrazine (useful reaction):

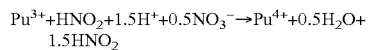

the destruction of the hydrazine with technetium (secondary parasite reactions):

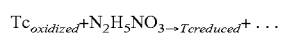

The first two reactions take place in the aqueous and solvent phases, whereas the reaction for the destruction of nitrous acid with hydrazine takes place only in the aqueous phase on account of the inextractability of hydrazine into solvent phase, which is composed of tri-n-butyl phosphate (TBP) at 30% (v/v) in a dodecane.

The presence of plutonium(III) in the solvent phase, even in small amount, catalyses the oxidation of the uranous nitrate by means of the first two reactions and thereby generates nitrous acid.

It has been observed, during experimental studies conducted in laboratory centrifugal extractors, that, even with short residence times in the extractor (of the order of a few seconds), the consumption of the uranous nitrate is very substantial. This oxidation of uranous nitrate develops essentially in the solvent phase, the hydrazine being present only in the aqueous phase. Thus, the operating schemes for this operation provide for a large excess of reducing agent.

The hydrazoic acid formed by the reaction for the destruction of nitrous acid with hydrazine in turn reacts with nitrous acid according to the reaction:

$$HN_3 + HNO_2 \rightarrow N_2 + N_2O + H_2O$$

The kinetics of this reaction are, however, very much slower than those of the reaction for the destruction of nitrous acid with hydrazine, and as such the hydrazoic acid is found in the effluent aqueous and solvent phases of the partition.

To ward against the risks associated with the explosiveness of hydrazoic acid, nitrous vapours are thus introduced into the reactor located downstream, in the direction of circulation of the solvent phase, of that in which the plutonium stripping takes place in order to reduce the amounts of hydrazoic acid present in the solvent phase, by a factor of about three, and to ensure an excess of nitrous acid relative to the residual hydrazoic acid (compliance with the criterion $NO_2^-/N_3^- > 2$). Compliance with this criterion thus imposes additional exploitation constraints.

Finally, the neutralization with sodium hydroxide and sodium carbonate of the hydrazoic acid during the subsequent solvent processing operations is reflected by an introduction of additional sodium, this element needing to be taken into account to comply with the maximum sodium contents imposed by the specifications relating to the resistance to leaching of the glass used for the waste vitrification.

Thus, the fact that hydrazine is not extractable into solvent phase and consequently acts only in the aqueous phase leads to a large consumption of reagents and to the production of chemical species that place a constraint on the exploitation of the process.

The Inventors thus set themselves the aim of finding a compound that is not only capable of destroying nitrous acid by reacting with it, but that can also be extracted with a solvent phase of the type used in operations for the reductive stripping of plutonium, so as to be able to block the reoxidation of plutonium(III) to plutonium(IV) and thus to limit, or even eliminate, all the constraints associated with this reoxidation.

DESCRIPTION OF THE INVENTION

This aim, and others, are achieved by the invention, which proposes the use of butyraldehyde oxime as an anti-nitrous agent in an operation for the reductive stripping of plutonium.

This oxime responds to the formula:

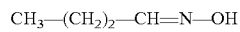

In accordance with the invention, the operation for the reductive stripping of plutonium includes:

a) placing in contact a water-immiscible solvent phase, containing an extracting agent in an organic diluent, and also the plutonium to be stripped, with a nitric aqueous phase containing a reducing agent capable of reducing plutonium (IV) to plutonium(III) and butyraldehyde oxime; and then
b) separating the solvent and aqueous phases.

In this operation, the reducing agent is preferably uranous nitrate.

Butyraldehyde oxime may be used as sole anti-nitrous agent or, in contrast, may be used together with a second anti-nitrous agent capable of destroying nitrous acid in aqueous phase. In this case, the second anti-nitrous agent, which is also present in the aqueous nitric phase used in step a), is preferably hydrazinium nitrate.

In any event, the butyraldehyde oxime concentration of the aqueous phase preferably ranges from 0.2 mol/l to 0.5 mol/l.

As regards the hydrazinium nitrate concentration of the aqueous phase, when it is present, it preferably ranges from 0.05 mol/l to 0.1 mol/l.

In accordance with the invention, the extracting agent present in the solvent phase may especially be a trialkyl phosphate, for instance tri-n-butyl phosphate (TBP), triisobutyl phosphate (TiBP) or triisoamyl phosphate (TiAP), TBP being preferred.

The organic diluent in which this extracting agent is present may itself be chosen from the various hydrocarbons proposed for liquid-liquid extraction, for instance toluene, xylene, t-butylbenzene, triisopropylbenzene, kerosene and linear or branched dodecanes, for instance n-dodecane or hydrogenated tetrapropylene (TPH), the latter two hydrocarbons being preferred.

Moreover, the operation for the reductive stripping of plutonium is preferably performed during the reprocessing of a spent nuclear fuel, i.e. it represents one of the operations employed in a process for the reprocessing of a spent nuclear fuel.

The use of butyraldehyde oxime as an anti-nitrous agent offers many advantages.

Specifically, since this oxime proves to be extractable into solvent phase and capable of very efficiently blocking therein the reoxidation of plutonium(III) to plutonium(IV) by virtue of its strong anti-nitrous power, its use makes it possible:

- to considerably reduce the amounts of uranous nitrate and of hydrazine (if the latter is used) necessary for performing an operation for the reductive stripping of plutonium;
- to reduce in consequence the number of points of introduction of these reagents into the apparatus dedicated to this operation, and thus to simplify this apparatus;
- to reduce also, or even eliminate, all the existing constraints downstream of an operation for the reductive stripping of plutonium as a result of the reoxidation of plutonium(III) to plutonium(IV), for instance, in the context of a process of Purex type, the need to introduce nitrous vapours in order to limit the explosion risks associated with the presence of hydrazoic acid in the solvent phase, and of additional sodium to neutralize this acid;
- to increase the plutonium concentration factor during its stripping and consequently to simplify the operating scheme of the operations directed towards purifying the plutonium thus stripped, with, as a bonus, a reduction of the consumption of reagents and of the dimensions of the apparatus.

Other arrangements and advantages of the invention will appear on reading the examples that follow, and which refer to the attached figures.

Needless to say, these examples are given merely as illustrations of the subject of the invention, and do not in any way constitute a limitation of this subject.

DETAILED DESCRIPTION OF PARTICULAR EMBODIMENTS

Example 1

Demonstration of the Extractability and of the Anti-nitrous Power in Solvent Phase of Butyraldehyde Oxime The capacity of butyraldehyde oxime to be extracted into solvent phase and to destroy nitrous acid therein was demonstrated by two different tests of reductive stripping of plutonium with uranous nitrate: a first test that was performed under conditions simulating the functioning of a mixing-decanting stage, and a second test that was performed in a laboratory centrifugal extractor.

1) Test Simulating the Functioning of a Mixing-decanting Stage:

This test consists in:
preparing an aqueous phase containing:
  25 g/l of Pu(IV),
  2.5 mol/l of nitric acid,
  0.1 mol/l of hydrazine, and
  0.5 mol/l of an oxime,
  this oxime being either butyraldehyde oxime or acetaldoxime of formula: $CH_3$—$CH$=$N$—$OH$;
equilibrating this aqueous phase with a solvent phase composed of TBP at 30% (v/v) in TPH (which is itself pre-equilibrated with a nitric acid solution of the same acid concentration), the volume ratio of the solvent phase to the aqueous phase (O/A) being 2;

adding to the aqueous phase uranous nitrate in a proportion of 40 g/l of aqueous phase;

mixing the aqueous and solvent phases for 1 minute;

separating the aqueous and solvent phases by centrifugation; and then measuring at intervals, over a period of 120 minutes, the absorbance of the solvent phase, at a wavelength of 650 nm, in order to assess the change of its uranous nitrate concentration.

Specifically, either the tested oxime is extracted into the solvent phase and destroys therein the nitrous acid sufficiently to block the reoxidation of Pu(III) to Pu(IV), in which case the uranous nitrate concentration of the solvent phase remains stable; or this is not the case, and then the uranous nitrate concentration of the solvent phase drops since it is consumed by the reoxidation of the Pu(III) to Pu(IV).

The test is performed at room temperature.

Figure 1:
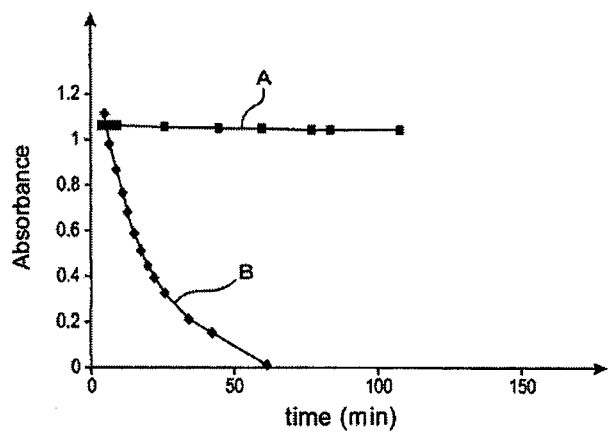
FIG. 1 shows, in the form of a curve, the change as a function of time, expressed in minutes, of the absorbance ($\lambda$=650 nm) of a solvent phase as obtained after an operation for the reductive stripping of plutonium with uranous nitrate, this stripping operation having been performed either with a nitric aqueous phase containing uranous nitrate, hydrazine and butyraldehyde oxime (curve A), or with a nitric aqueous phase containing uranous nitrate, hydrazine and acetaldoxime (curve B).

FIG. 1 shows, in the form of curves, the absorbance values obtained as a function of time, curve A corresponding to the test performed with the aqueous phase containing butyraldehyde oxime, curve B corresponding to the test performed with the aqueous phase containing acetaldoxime.

As shown in this figure, the uranous nitrate concentration of the solvent phase is stable more than 120 minutes after its separation from the aqueous phase in the case of the test performed with the aqueous phase containing butyraldehyde oxime, which is evidence of the real capacity of this oxime to be extracted into solvent phase and to destroy therein the nitrous acid, and thus to block the reoxidation of Pu(III) to Pu(IV).

On the other hand, in the case of the test performed with the aqueous phase containing acetaldoxime, which nonetheless is structurally very similar to butyraldehyde oxime, the uranous nitrate concentration of the solvent phase falls rapidly to reach the x-axis about 60 minutes after its separation from the aqueous phase.

2. Test in a Laboratory Centrifugal Extractor:

Laboratory centrifugal extractors are one-stage machines that comprise a cylinder (or bowl) rotating about a fixed central axis by means of an electrical DC motor, and systems for introducing into this cylinder and for removing therefrom an aqueous phase and a solvent phase.

The bowl comprises a mixing chamber and a decantation chamber. The aqueous and solvent phases, conveyed by their respective feed circuits, are brought via a common pipe to the mixing chamber in which rapid blending takes place. Next, the emulsion obtained flows out into the decantation chamber where the aqueous and solvent phases are rapidly separated under the effect of the centrifugal field. They are then extracted from the apparatus by means of centripetal collectors and removed via two independent channels.

Such apparatus makes it possible to check, on a laboratory scale, the feasibility and validity of processes intended to be employed in plants for reprocessing spent nuclear fuels.

The test was performed using the following operating parameters:

Entering solvent phase:
   TBP at 30% (v/v) in TPH
   Pu(IV) concentration: 20.86 g/l
   $HNO_3$ concentration: 0.2 mol/l
   flow rate: 252 ml/h
Entering aqueous phase:
   U(IV) concentration: 83 g/l
   $HNO_3$ concentration: 1 mol/l
   hydrazine concentration: 0.11 mol/l
   butyraldehyde oxime concentration: 0.5 mol/l
   flow rate: 101 ml/h
U(IV)/Pu(IV) ratio: 1.6
O/A volume ratio: 2.5
residence time of the phases in the mixer: 20 s.

The results are presented in Table I below.

TABLE I

| Exiting solvent phase: | |
| --- | --- |
| Pu(IV) concentration in g/l | 1 |
| U(IV) concentration in g/l | 15.2 |
| Exiting aqueous phase: | |
| Pu concentration in g/l | 49.3 |
| U(IV) concentration in g/l | 19.2 |
| $HNO_3$ concentration in mol/l | 1.5 |
| hydrazine concentration in mol/l | 0.13 |
| Performance: | |
| Pu decontamination factor | 20.9 |
| $U(IV)_{consumed}/Pu_{stripped}$ | 0.56 |

This table shows that the ratio of the uranous nitrate consumed to the plutonium stripped from the solvent phase is very close to 0.5, which means that little plutonium(III) became reoxidized in this solvent phase. Moreover, the uranous nitrate concentration of the solvent phase remained stable for more than two hours after it left the extractor.

For comparative purposes, similar tests that were performed in the same type of extractor but using an aqueous phase containing only hydrazine as anti-nitrous agent, led to ratios of the uranous nitrate consumed to the plutonium stripped twice as large for a plutonium decontamination factor twice as small.

Butyraldehyde oxime is thus capable, unlike hydrazine, of destroying nitrous acid in solvent phase and thus of blocking the reoxidation of plutonium(III) to plutonium(IV) in this phase.

Example 2

Application of the Invention to a Reductive Stripping of Plutonium in Mixer-decanters Butyraldehyde oxime may advantageously be used in an operation for the selective stripping of plutonium in a first decontamination cycle of a process of Purex type with partition of the U/Pu streams.

This is an operation that typically uses uranous nitrate as reducing agent and hydrazine as anti-nitrous agent, and which is employed in mixer-decanters.

Figure 2:
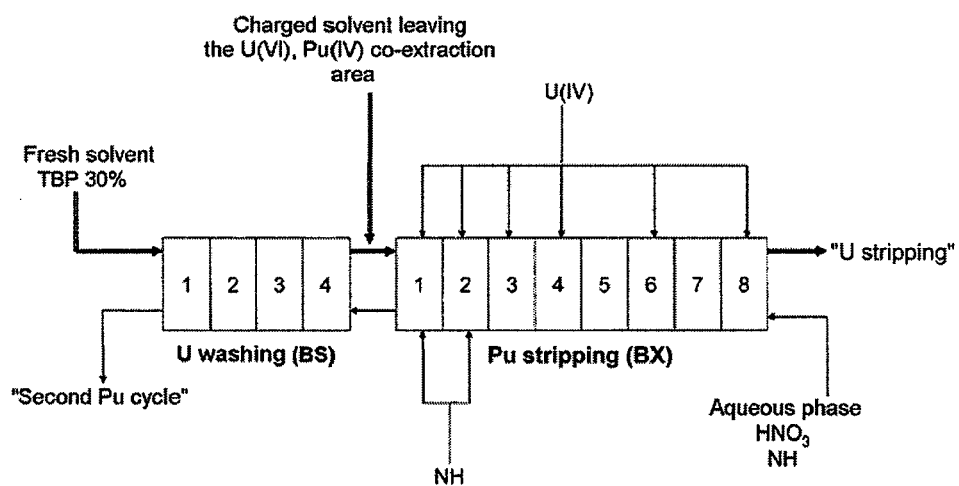
FIG. 2 shows, in a schematic form, an operation for the reductive stripping of plutonium with uranous nitrate as is typically employed during the first decontamination cycle of a process of Purex type with partition of the U/Pu streams.

As shown in FIG. 2 which schematically represents this operation, the solvent phase charged with U(VI) and Pu(IV) arriving from the co-extraction area of the cycle enters the area known as "Pu stripping", noted BX, which includes 8 mixer-decanter stages.

At each stage, this solvent phase is mixed with an aqueous nitric phase of low acidity (0.05 M to 2 M) containing uranous nitrate and hydrazine, and is then separated from this phase.

The aqueous phase leaving the "Pu stripping" area enters the area known as "U washing", noted BS, which includes 4 mixer-decanter stages and whose function is to remove from this aqueous phase (by re-extraction into a fresh solvent phase) the uranium(VI) fraction that has been stripped with the plutonium. The solvent phase leaving the "Pu stripping" area is, itself, conveyed towards a "U stripping" area, and whose function is to back-extract the uranium(VI) from this phase.

The plutonium stripping operation thus employed requires the use of a large excess of uranous nitrate (10 times the stoichiometric amount) and of hydrazine, since the parasite reoxidations of plutonium are substantial on account of the relatively long residence times of the solvent phase in the decantation compartments of the mixer-decanters.

The uranous nitrate and hydrazine are thus introduced into several points of the "Pu stripping" area to ensure a sufficient presence of uranous nitrate throughout the plutonium stripping operation.

To evaluate the gain associated with the use of butyraldehyde oxime as an anti-nitrous agent, three different schemes were simulated with the Parex code, which is software dedicated to this type of operation and which is used for the design and operating analysis of the industrial workshops of the La Hague plants.

The first scheme (scheme 1 below) corresponds to a standard scheme in which only hydrazine is used as anti-nitrous agent.

The second scheme (scheme 2 below) corresponds to a scheme in which butyraldehyde oxime is used together with hydrazine, in an amount sufficient to block the plutonium(III) reoxidation reaction in solvent phase, without reduction of the amounts of uranous nitrate and hydrazine employed in the standard scheme.

The third scheme (scheme 3 below) corresponds to a scheme in which the use of butyraldehyde oxime is combined with a reduction of the amounts of uranous nitrate and hydrazine employed in the standard scheme.

Figure 3:
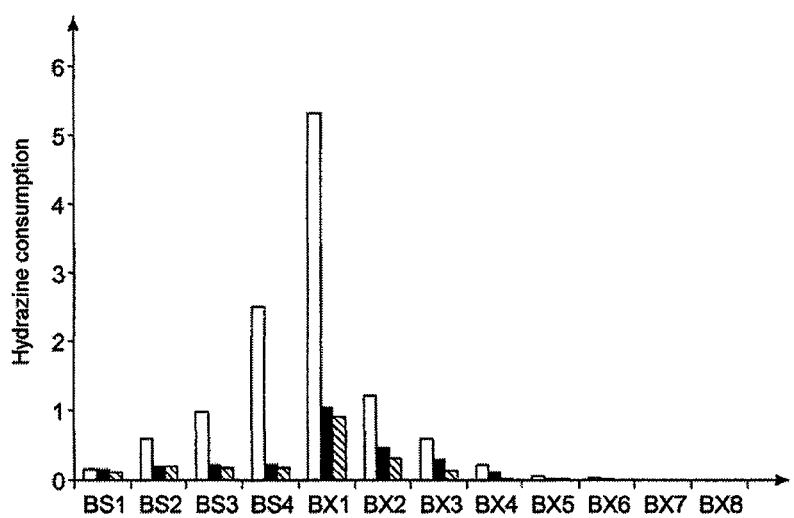
FIG. 3 shows, in the form of histograms, the hydrazine consumption profiles as determined by the Parex code for three different implementation schemes of the operation illustrated in FIG. 2: a first scheme (white rectangles) in which only hydrazine is used as anti-nitrous agent; a second scheme (black rectangles) in which butyraldehyde oxime is used together with hydrazine, without reduction of the amounts of uranous nitrate and of hydrazine used in the first scheme; and a third scheme (dashed rectangles) in which butyraldehyde oxime is used together with hydrazine, with reduction of the amounts of uranous nitrate and of hydrazine used in the first scheme.

The results of these simulations are presented:

in Table II below which states, for each of the schemes 1, 2 and 3, the ratios between the amounts of uranous nitrate and hydrazine and the amount of plutonium introduced into the "Pu stripping" area, the ratios between the amounts of uranous nitrate and of hydrazine consumed and the amount of plutonium introduced into the "Pu stripping" area, the ratio between the amount of hydrazoic acid produced and the amount of hydrazine consumed, and finally the ratio between the amount of hydrazoic acid produced and the amount of plutonium introduced into the "Pu stripping" area; and in FIG. 3, which shows, for the three schemes, the hydrazine consumption as obtained in each of the stages of the "U washing" areas (stages BS1 to BS4) and "Pu stripping" areas (stages BX1 to BX8), the white rectangles corresponding to scheme 1, the black rectangles corresponding to scheme 2 and the dashed rectangles corresponding to scheme 3.

It should be noted that it has been considered, in these simulations, that the hydrazine was consumed in preference to the butyraldehyde oxime in the aqueous phase. The consumption of the butyraldehyde oxime was therefore not simulated, but it may be thought that the absence of reoxidation of Pu(III) in the solvent phase leads to a very low consumption of this reagent.

TABLE II

| Scheme | Reagents introduced | | Consumption of uraneous nitrate and hydrazine | | Production of $HN_3$ | |
|---|---|---|---|---|---|---|
| | $U(IV)/Pu_{int.}$ | $NH/Pu_{int.}$ | $U(IV)_{cons.}/PU_{int.}$ | $NH_{cons.}/PU_{int.}$ | $HN_3/NH_{cons.}$ | $HN_3/Pu_{int.}$ |
| 1 | 5 | 15.9 | 2.31 | 1.71 | 0.57 | 0.98 |
| 2 | 5 | 15.9 | 0.5 (−78.4%) | 0.4 (−76.6%) | 0.51 (−10.5%) | 0.2 (−79.6%) |
| 3 | 0.56 | 7.34 | 0.5 (−78.4%) | 0.3 (−82.5%) | 0.46 (−19.3%) | 0.14 (−82.3%) |

This table and this figure show that the addition of butyraldehyde oxime to the aqueous phase makes it possible to block the reoxidation of Pu(III) in the solvent phase and that this blocking is reflected by an approximately 80% reduction in the consumption of uranous nitrate, in the consumption of hydrazine and in the production of hydrazoic acid.

This allows a substantial reduction in the amounts of uranous nitrate and of hydrazine to be introduced into the "Pu stripping" area—as is proposed in scheme 3 (a virtual 10-fold reduction in the amount of uranous nitrate introduced and a twofold reduction in the amount of hydrazine introduced)—which itself allows deletion of the numerous points of introduction of these reagents shown in FIG. 2.

Figure 4:
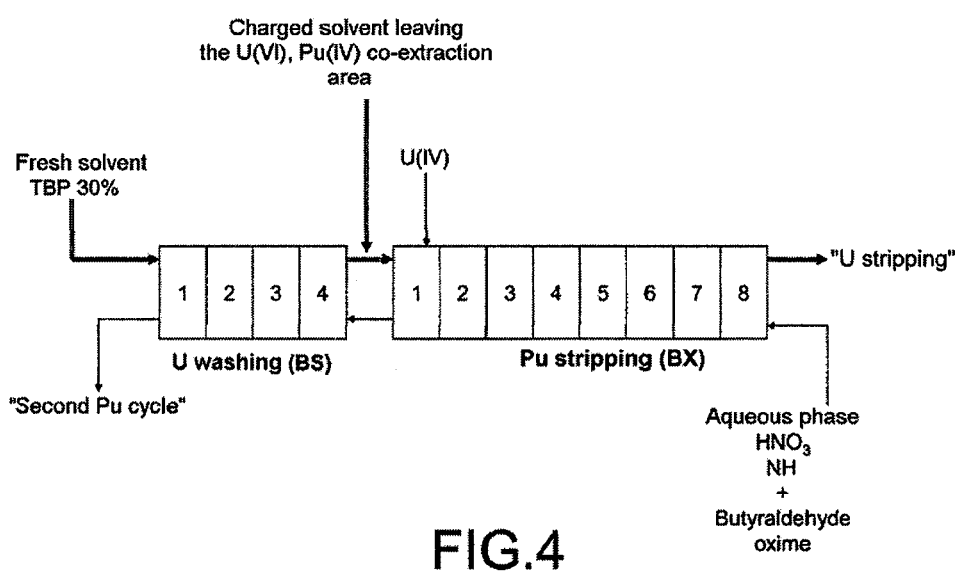
FIG. 4 shows, in a schematic form, an operation for the reductive stripping of plutonium with uranous nitrate as would be able to be employed in the first decontamination cycle of a process of Purex type with partition of the U/Pu streams, if butyraldehyde oxime were used as anti-nitrous agent.

Thus, it may be envisaged to perform the plutonium stripping according to the scheme shown in FIG. 4, with only one introduction of uranous nitrate at the start of the "Pu stripping" area and only one introduction of anti-nitrous agent (butyraldehyde oxime+hydrazine) at the end of this same area, resulting in simplification of the apparatus used in this area.

Needless to say, the butyraldehyde oxime should be present at a concentration sufficient to block the reoxidation of the Pu(III) in the solvent phase. A concentration in the aqueous phase entering the "Pu stripping" area ranging from 0.2 mol/l to 0.5 mol/l appears to be sufficient, the hydrazine concentration in this phase then possibly being from 0.05 mol/l to 0.1 mol/l.

Moreover, it turns out that the adoption of a high concentration factor in the operations for the reductive stripping of plutonium is often limited by the increase in the parasite reoxidation of plutonium that it generates. Specifically, an increase in the concentration factor leads to an increase in the plutonium and acid concentrations, which accelerates the kinetics of the reoxidation reaction of plutonium(III) to plutonium(IV).

Thus, the use of an anti-nitrous agent that is capable of blocking this reoxidation, for instance butyraldehyde oxime, also makes it possible to envisage a simplification of the operating scheme of a process of Purex type with partition of the U/Pu streams, in workshops dedicated to the purification of the plutonium stream, with, as a bonus, a reduction in the consumption of reagents and of the dimensions of the apparatus.

Specifically, when the plutonium stream produced during the "Second plutonium cycle" is not sufficiently concentrated to subsequently convert this plutonium into plutonium oxide, part of the plutonium production is recycled into the inlet of this cycle to obtain a more concentrated stream. The stream of material that needs to be processed is thus increased, this increase possibly going as far, in certain cases, as doubling the plutonium stream that needs to be processed. This results in an increased consumption of reagents and a more substantial sizing of the apparatus, which may be avoided by using butyraldehyde oxime during the "Pu stripping".

CITED REFERENCE:

WO 2006/072729

The invention claimed is:

1. A method of reprocessing spent nuclear fuels using butyraldehyde oxime as an anti-nitrous agent for the reductive stripping of plutonium, the method comprising:
   a) putting a water-immiscible solvent phase containing plutonium in oxidation state (IV) to be stripped and an extracting agent in an organic diluent, into contact with an aqueous phase containing nitric acid, a reducing agent capable of reducing plutonium from oxidation state (IV) to oxidation state (III) and butyraldehyde oxime capable of destroying nitrous acid in the reductive stripping of plutonium, wherein the reducing agent is uranous nitrate, and
   b) after the step a), separating the solvent and aqueous phases.

2. The method according to claim 1, in which the aqueous phase contains a second anti-nitrous agent, this anti-nitrous agent being capable of destroying nitrous acid in the aqueous phase.

3. The method according to claim 2, in which the second anti-nitrous agent is hydrazinium nitrate.

4. The method according to claim 1, in which the butyraldehyde oxime concentration of the aqueous phase is from 0.2 mol/l to 0.5 mol/l.

5. The method according to claim 3, in which the hydrazinium nitrate concentration of the aqueous phase is from 0.05 mol/l to 0.1 mol/l.

6. The method according to claim 1, in which the extracting agent is a trialkyl phosphate.

7. The method according to claim 6, in which the trialkyl phosphate is tri-n-butyl phosphate.

8. The method according to claim 1, in which the organic diluent is a dodecane.

9. The method according to claim 8, in which the dodecane is n-dodecane.

* * * * *